US012599866B2

(12) United States Patent
Wu et al.

(10) Patent No.: US 12,599,866 B2
(45) Date of Patent: Apr. 14, 2026

(54) MEMBRANE-BASED DESORPTION COOLING METHOD FOR PASSIVE THERMAL MANAGEMENT

(71) Applicant: City University of Hong Kong, Hong Kong (HK)

(72) Inventors: Wei Wu, Hong Kong (HK); Fuxiang Li, Hong Kong (HK); Zengguang Sui, Hong Kong (HK); Zhixiong Ding, Hong Kong (HK); Yunren Sui, Hong Kong (HK); Chong Zhai, Hong Kong (HK); Haosheng Lin, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 371 days.

(21) Appl. No.: 18/183,184

(22) Filed: Mar. 14, 2023

(65) Prior Publication Data

US 2023/0302395 A1 Sep. 28, 2023

Related U.S. Application Data

(60) Provisional application No. 63/323,483, filed on Mar. 24, 2022.

(51) Int. Cl.
*B01D 53/04* (2006.01)
*B01D 61/18* (2006.01)
(Continued)

(52) U.S. Cl.
CPC ......... *B01D 53/0438* (2013.01); *B01D 61/18* (2013.01); *B01D 71/261* (2022.08);
(Continued)

(58) Field of Classification Search
CPC ....................... B01D 53/1425; B01D 53/1443; B01D 53/22; B01D 53/263; B01D 53/268;
(Continued)

(56) References Cited

U.S. PATENT DOCUMENTS

| | | | |
|---|---|---|---|
| 7,735,327 B2* | 6/2010 | Brower | F28D 20/02 62/530 |
| 10,355,154 B1* | 7/2019 | Bayoumi | H10F 77/68 |

(Continued)

OTHER PUBLICATIONS

Tamvada et al.., Membrane-Based two Phase Heat Sinks for High Heat flux Electronics and Lasers, IEEE Transactions on Components, Packaging, and Manufacturing Technology vol. 11 No. 10, pp. 1734-1741. (Year: 2021).*

(Continued)

*Primary Examiner* — Duane Smith
(74) *Attorney, Agent, or Firm* — Idea Intellectual Limited; Sam T. Yip

(57) ABSTRACT

A membrane-based desorption cooling method for passive thermal management is presented. The module includes: (i) a covering layer for thermally conducting and transferring heat from a device to a solution; (ii) a solution layer for confining $H_2O$/absorbent mixtures in a multi-compartment frame; (iii) a membrane layer configured to act as an interface between the solution and air; and (iv) a supporting layer configured to increase the mechanical strength and including apertures to permit mass transfer from the membrane through the supporting layer. The present membrane-based desorption cooling module is able to be used for thermal management of solar photovoltaic (PV) panels, electronics, batteries, or any other devices that require heat removal.

19 Claims, 10 Drawing Sheets

(51) Int. Cl.
| | |
|---|---|
| *B01D 71/26* | (2006.01) |
| *B01D 71/34* | (2006.01) |
| *B01D 71/36* | (2006.01) |

(52) U.S. Cl.
CPC ........... *B01D 71/262* (2022.08); *B01D 71/34* (2013.01); *B01D 71/36* (2013.01); *B01D 2325/0283* (2022.08)

(58) Field of Classification Search
CPC ............ B01D 2315/22; B01D 2315/40; B01D 2257/80; F28C 3/06; F28C 3/08; F24S 10/80; F25J 2205/80; F24F 2003/1435; F24F 31/1411; F24F 31/1417; F24F 31/1429; H10F 77/60; H10F 77/63; H10F 77/67; H10F 77/68; H01M 6/5038; H01M 10/60; H01M 10/613; H01M 10/617; H01M 10/655; H01M 10/6556; H01M 10/6562; H01M 10/6552; H01M 10/6567; H01M 10/6569; H01M 10/659; H01M 10/66; H01M 10/663
USPC .......... 429/12; 136/243, 244; 96/4, 5, 6, 219, 96/234, 240, 241, 242; 95/44, 45, 46, 52, 95/231, 227, 228, 209, 214, 193, 178, 95/179, 180
See application file for complete search history.

(56) References Cited

U.S. PATENT DOCUMENTS

| | | | | | |
|---|---|---|---|---|---|
| 11,728,766 | B2 * | 8/2023 | Wang | .................... | H02S 40/425 |
| | | | | | 136/251 |
| 12,231,085 | B2 * | 2/2025 | Brooks | ..................... | E03B 3/28 |
| 2004/0045596 | A1 * | 3/2004 | Lawheed | .............. | H10F 77/488 |
| | | | | | 136/246 |
| 2010/0051088 | A1 * | 3/2010 | Levin | ...................... | H02S 40/22 |
| | | | | | 136/246 |
| 2010/0170561 | A1 * | 7/2010 | Peng | ........................ | H10F 77/68 |
| | | | | | 136/246 |
| 2010/0276120 | A1 * | 11/2010 | Takagi | ................ | H01M 6/5038 |
| | | | | | 165/104.33 |
| 2011/0168167 | A1 * | 7/2011 | Guha | .................... | F28D 15/046 |
| | | | | | 126/698 |
| 2012/0060896 | A1 * | 3/2012 | Schafer | ................... | H02S 40/44 |
| | | | | | 136/246 |
| 2013/0036752 | A1 * | 2/2013 | Cochran | ................. | H10F 77/68 |
| | | | | | 62/62 |
| 2013/0036909 | A1 * | 2/2013 | Menard | ................... | F24S 40/42 |
| | | | | | 95/91 |
| 2013/0240017 | A1 * | 9/2013 | Lasich | ..................... | H10F 77/68 |
| | | | | | 136/246 |
| 2013/0306133 | A1 * | 11/2013 | Mueller | .................. | F24S 40/52 |
| | | | | | 136/246 |
| 2014/0007919 | A1 * | 1/2014 | Brottier | ................ | H10F 77/488 |
| | | | | | 136/246 |
| 2014/0041710 | A1 * | 2/2014 | Hwang | ................... | H10F 77/68 |
| | | | | | 136/246 |
| 2015/0136201 | A1 * | 5/2015 | Mariotto | ................. | H02S 40/00 |
| | | | | | 136/246 |
| 2017/0263789 | A1 * | 9/2017 | Simpson | ................. | H02S 40/42 |
| 2017/0294876 | A1 * | 10/2017 | Friesen | ............... | F24S 10/25 |
| 2019/0123405 | A1 * | 4/2019 | Jeon | .................... | H01M 10/625 |
| 2022/0228351 | A1 * | 7/2022 | Friesen | ............... | B01D 53/261 |
| 2022/0316192 | A1 * | 10/2022 | Friesen | ............... | B01D 53/265 |
| 2023/0302395 | A1 * | 9/2023 | Wu | ........................ | B01D 71/34 |
| 2024/0216856 | A1 * | 7/2024 | Braun | ............... | B01D 53/0438 |
| 2024/0397666 | A1 * | 11/2024 | Rubi | ..................... | H02S 40/425 |

OTHER PUBLICATIONS

Hanks et al., Nanoporous Evaporative Device for Advanced Electronics Thermal Management , Fourteenth Intersociety Conference on Thermal and Thermomechanical Phenomena in Electronic Systems. (Year: 2014).*

2021.*

2014.*

Wei Wu et al. Absorption Heating Technologies. Efficient Heating, Heat Recovery and Renewable Energy, Spinger Nature, 2020.

Wei Wu et al. Air source absorption heat pump in district heating: Applicability analysis and improvement options, Energy Conversion and Management, 2015, 96, 197-207.

Wei Wu et al. Simulation of a combined heating, cooling and domestic hot water system based on ground source absorption heat pump. Applied Energy, 2014, 126, 113-22.

Wei Wu et al. Experimental investigation on NH3—H2O compression-assisted absorption heat pump (CAHP) for low temperature heating under lower driving sources, Applied Energy, 2016, 176, 258-271.

Jian Wang et al. Experimental investigation on NH3—H2O generator-absorber heat exchange (GAX) absorption heat bump, Energy, 2019, 185, 337-349.

Wei Wu et al. A novel hybrid-energy heat pump with refrigerant injection: Performance characterization and injection optimization, Energy Conversion and Management, 2020, 208, 112584.

Zhixiong Ding et al. Dynamic characteristics and performance improvement of a high-efficiency double-effect thermal battery for cooling and heating, Applied Energy, 2020, 264, 114768.

Zhixiong Ding et al. A hybrid compression-assisted absorption thermal battery with high energy storage density/efficiency and low charging temperature, Applied Energy, 2021, 282, 116068.

Chong Zhai et al. Heat and mass transfer performance comparison of various absorbers/desorbers towards compact and efficient absorption heat pumps, International Journal of Refrigeration, 2021, 127, 203-220.

Chong Zhai et al. Performance optimization and comparison towards compact and efficient absorption refrigeration system with conventional and emerging absorbers/desorbers, Energy, 2021, 229, 120669.

Zengguang Sui et al. Performance investigation and enhancement of membrane-contactor microchannel absorber towards compact absorption cooling, International Journal of Heat and Mass Transfer, 2021, 169, 120978.

Zengguang Sui et al. Swirling flow for performance improvement of a microchannel membrane-based absorber with discrete inclined grooves. International Journal of Refrigeration, 2021, 130, 382-391.

Wei Wu et al. Performance comparison of absorption heating cycles using various low-GWP and natural refrigerants, International Journal of Refrigeration 2017, 82, 56-70.

Wei Wu et al. Thermodynamic Investigation and Comparison of Absorption Cycles Using Hydrofluoroolefins and Ionic Liquid, Ind. Eng. Chem. Res. 2017, 56, 9906-9916.

Wei Wu et al. Comparisons of different ionic liquids combined with trans-1,3,3,3-tetrafluoropropene (R1234ze(E)) as absorption working fluids, International Journal of Refrigeration, 2018, 88, 45-57.

Wei Wu et al. Comparative analysis of conventional and low-GWP refrigerants with ionic liquid used for compression-assisted absorption cooling cycles, Applied Thermal Engineering, 2020, 172, 115145.

Wei Wu et al. Compression-assisted absorption cycles using ammonia and various ionic liquids for cleaner heating, Journal of Cleaner Production, 2018, 195, 890-907.

Wei Wu et al. Screening of novel water/ionic liquid working fluids for absorption thermal energy storage in cooling systems. Int J Energy Res. 2020, 44, 9367-9381.

Wei Wu et al. Charging and discharging characteristics of absorption thermal energy storage using ionic-liquid-based working fluids, Energy, 2019, 189, 116126.

Wei Wu et al. Comparative dynamic performance of hybrid absorption thermal batteries using H2O/1,3-dimethylimidazolium dimethylphosphate, Energy Conversion and Management, 2021, 228, 113690.

Zengguang Sui et al. Multi-objective optimization of a microchannel membrane-based absorber with inclined grooves based on CFD and machine learning. Energy, 2022, 240, 122809.

(56)     References Cited

OTHER PUBLICATIONS

Qingmei Wen et al. Genetic algorithm-based operation strategy optimization and multi-criteria evaluation of distributed energy system for commercial buildings, Energy Conversion and Management, 2020, 226, 113529.

Joeri Rogelj et al. Paris Agreement climate proposals need a boost to keep warming well below 2° C. Nature, 2016, 534, 631-639.

Heleen L. van Soest et al. Net-zero emission targets for major emitting countries consistent with the Paris Agreement. Nature Communications, 2021, 12(2140), 1-9.

Dennis Normile, China's bold climate pledge earns praise—but is it feasible? Science, 2020, 370, 17-18.

Ying Zhou et al. Pathways to a more efficient and cleaner energy system in Guangdong-Hong Kong-Macao Greater Bay Area: A system-based simulation during 2015-2035, Resources, Conservation & Recycling, 2021, 174, 105835.

Solar PV—Renewables 2020—Analysis—IEA. https://www.iea.org/reports/renewables-2020/solar-pv.

Future of Solar Photovoltaic, International Renewable Energy Agency, 2019.

Wei Wu et al. Residential net-zero energy buildings: Review and perspective, Renewable and Sustainable Energy Reviews, 2021, 142, 110859.

Saeed Siah Chehreh Ghadikolaei, Solar photovoltaic cells performance improvement by cooling technology: An overall review, International Journal of Hydrogen Energy, 2021, 46, 10939-10972.

J. Siecker et al. A review of solar photovoltaic systems cooling technologies. Renewable and Sustainable Energy Reviews, 2017, 79, 192-203.

A.W. Kandeal et al. Photovoltaics performance improvement using different cooling methodologies: A state-of-art review, Journal of Cleaner Production, 2020, 273, 122772.

Hong Kong's Climate Action Plan 2030+ 2017.

J.G. Hernandez-Perez et al. Thermal performance of a discontinuous finned heatsink profile for PV passive cooling, Applied Thermal Engineering, 2021, 184, 116238.

Maarten Dorenkämper et al. The cooling effect of floating PV in two different climate zones: A comparison of field test data from the Netherlands and Singapore, Solar Energy, 2021, 214, 239-247.

Priscilla Huen et al. Advances in hybrid solar photovoltaic and thermoelectric generators, Renewable and Sustainable Energy Reviews, 2017, 72, 1295-1302.

Wenbin Wang et al. Integrated solar-driven PV cooling and seawater desalination with zero liquid discharge, Joule, 2021, 5, 1873-1887.

Wei Pang et al. Empirical study on thermal performance through separating impacts from a hybrid PV/TE system design integrating heat sink, International Communications in Heat and Mass Transfer, 2015, 60, 9-12.

Todd P. Otanicar et al. Envisioning advanced solar electricity generation: Parametric studies of CPV/T systems with spectral filtering and high temperature PV, Applied Energy, 2015, 140, 224-233.

Linxiao Zhu et al. Radiative cooling of solar cells, Optica, 2014, 1(1), 32-38.

Sandro Nižetić et al. A novel and effective passive cooling strategy for photovoltaic panel, Renewable and Sustainable Energy Reviews, 2021, 145, 111164.

Renyuan Li et al. Photovoltaic panel cooling by atmospheric water sorption-evaporation cycle, Nature Sustainability, 2020, 3, 636-643.

Jonathan Ibarra-Bahena et al. Performance of Different Experimental Absorber Designs in Absorption Heat Pump Cycle Technologies: A Review, Energies, 2014, 7, 751-766.

Carlos Amaris et al. Vapour absorption enhancement using passive techniques for absorption cooling/heating technologies: A review, Applied Energy, 2018, 231, 826-853.

Beethoven Narváez-Romo et al. A critical review of heat and mass transfer correlations for LiBr—H2O and NH3—H2O absorption refrigeration machines using falling liquid film technology, Applied Thermal Engineering, 2017, 123, 1079-1095.

Ananda Krishna Nagavarapu et al. Experimentally validated models for falling-film absorption around microchannel tube banks: Hydrodynamics, International Journal of Heat and Mass Transfer, 2019, 134, 815-827.

A. González-Gil et al. New flat-fan sheets adiabatic absorber for direct air-cooled LiBr/H2O absorption machines: Simulation, parametric study and experimental results, Applied Energy, 2012, 98, 162-173.

J.F. Chen et al. Experimental investigation on a novel air-cooled single effect LiBr—H2O absorption chiller with adiabatic flash evaporator and adiabatic absorber for residential application, Solar Energy, 2018, 159, 579-587.

Fabrizio Cola et al. Characterization of the droplet formation phase for the H2O—LiBr absorber: An analytical and experimental analysis, Applied Energy, 2018, 222, 885-897.

A. Zacarías et al. Experimental assessment of vapour adiabatic absorption into solution droplets using a full cone nozzle, Experimental Thermal Fluid Science, 2015, 68, 228-238.

G. Gutiérrez-Urueta et al. Experimental performances of a LiBr-water absorption facility equipped with adiabatic absorber, International Journal of Refrigeration, 2011, 34, 1749-1759.

Julia Aman et al. Bubble-pump-driven LiBr—H2O and LiCl—H2O absorption air-conditioning systems, Thermal Science and Engineering Progress, 2018, 6, 316-322.

A. Zohar et al. The influence of the generator and bubble pump configuration on the performance of diffusion absorption refrigeration (DAR) system, International Journal of Refrigeration, 2008, 31, 962-969.

V. Gudjonsdottir et al. Experimental investigation of absorption in upward and downward flow of NH3—CO2—H2O in a minichannel heat exchanger, International Journal of Heat and Mass Transfer, 2020, 152, 119483.

Xi Wu et al. Development of bubble absorption refrigeration technology: A review, Renewable and Sustainable Energy Reviews, 2018, 82, 3468-3482.

M. Suresh et al. Experimental studies on heat and mass transfer characteristics for R134a-DMF bubble absorber, International Journal of Refrigeration, 2012, 35, 1104-1114.

Faisal Asfand et al. A review of membrane contactors applied in absorption refrigeration systems, Renewable and Sustainable Energy Reviews, 2015, 45, 173-191.

Ahmed Hamza H. Ali, Design of a compact absorber with a hydrophobic membrane contactor at the liquid-vapor interface for lithium bromide-water absorption chillers, Applied Energy, 2010, 87, 1112-1121.

N. García-Hernando et al. Experimental characterisation of a novel adiabatic membrane-based micro-absorber using H2O—LiBr, International Journal of Heat and Mass Transfer, 2019, 129, 1136-1143.

Sung Joo Hong et al. Mass recovery characteristics of hydrophobic hollow fiber membrane-based refrigerant mass exchangers in vapor absorption refrigeration systems, Journal of Membrane Science, 2019, 580, 177-189.

Luisa F. Cabeza et al. Review on sorption materials and technologies for heat pumps and thermal energy storage, Renewable Energy, 2017, 110, 3-39.

Keith E. Herold et al. Absorption Chillers and Heat Pumps, CRC Press, 2016.

Wei Wu et al. Absorption heating technologies: A review and perspective, Applied Energy, 2014, 130, 51-71.

Kai Wang et al. State-of-the-art review on crystallization control technologies for water/LiBr absorption heat pumps, International Journal of Refrigeration, 2011, 34, 1325-1337.

Antonio De Lucas et al. Absorption of Water Vapor into New Working Fluids for Absorption Refrigeration Systems, Ind. Eng. Chem. Res. 2007, 46, 345-350.

Yoon Jo Kim et al. Thermodynamic analysis of an absorption refrigeration system with ionic-liquid/refrigerant mixture as a working fluid, Energy, 2012, 44, 1005-1016.

A. Yokozeki et al. Water Solubility in Ionic Liquids and Application to Absorption Cycles, Ind. Eng. Chem. Res. 2010, 19, 9496-9503.

(56)         References Cited

OTHER PUBLICATIONS

Xiaodong Zhang et al. Performance simulation of the absorption chiller using water and ionic liquid 1-ethyl-3-methylimidazolium dimethylphosphate as the working pair, Applied Thermal Engineering, 2011, 31, 3316-3321.

Li Dong et al. Performance prediction of absorption refrigeration cycle based on the measurements of vapor pressure and heat capacity of H2O+[DMIM]DMP system, Applied Energy, 2012, 98, 326-332.

Daniel B. Boman et al. A method for comparison of absorption heat pump working pairs, International Journal of Refrigeration, 2017, 77, 149-175.

Hongtao Gao et al. Effect of adding copper oxide nanoparticles on the mass/heat transfer in falling film absorption, Applied Thermal Engineering, 2020, 181, 115937.

Fatemeh Seifikar et al. Super-stable carbon quantum dots nanofluid for efficient solar-thermal conversion, Energy Conversion and Management, 2021, 228, 113675.

* cited by examiner

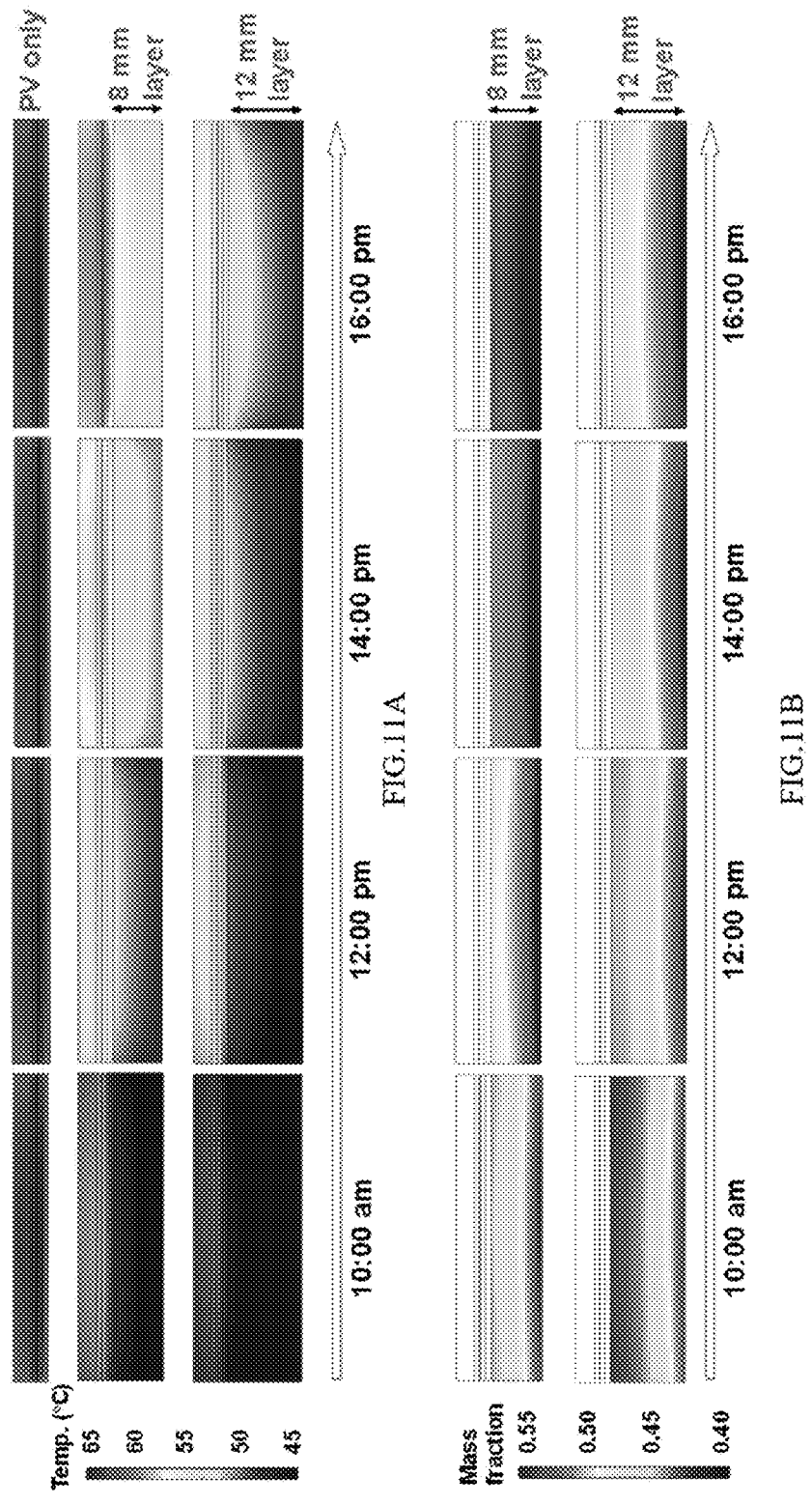

MEMBRANE-BASED DESORPTION COOLING METHOD FOR PASSIVE THERMAL MANAGEMENT

CROSS-REFERENCE TO RELATED APPLICATIONS

The present application claims priority from a U.S. provisional patent application Ser. No. 63/323,483 filed 24 Mar. 2022, and the disclosures of which are incorporated by reference in their entirety.

FIELD OF THE INVENTION

The present invention relates to cooling modules, and more particularly, to membrane-based desorption cooling modules.

BACKGROUND

Global warming is a worldwide challenge caused by large energy consumption and greenhouse gas emissions. Carbon neutrality, also called net-zero carbon emission, has been regarded as an effective pathway towards a sustainable future. Many countries and regions have made ambitious goals for carbon neutrality, with many of them targeting the years around 2050-2060. Solar energy is playing an increasingly important role in the low-carbon energy transition. It is estimated that the total installed solar photovoltaic (PV) capacity will reach 8000 GW by 2050. There are intensive research and development activities towards economic and efficient solar PV applications around the world.

For commercially available PV panels, the typical electric efficiency is in the range of 10-20%. The remaining solar energy is converted into thermal energy and thus increases the temperature of the PV panel. A high PV panel temperature not only shortens the lifetime but also decreases the electric efficiency. As a result, thermal management has been adopted as an effective method to cool down the PV panel and thus enhance solar efficiency and reliability. Thermal management technologies are classified into active and passive methods. Active thermal management usually uses mechanical components to circulate air or water for heat removal, suffering from high energy consumption and system complexity. Passive thermal management is naturally driven by spontaneous thermal processes, which is attractive due to zero energy use and simple configuration. In addition, passive thermal management is especially suitable for remote areas with limited maintenance, energy, and water.

There have been a variety of conventional and emerging passive technologies for thermal management, including finned structure, floating PV, spectrum splitting, radiative cooling, phase change material, adsorptive hydrogel, etc. However, existing passive thermal management technologies still need improvement in cooling power and system reliability. Thus, there is a need in the art for improved thermal management techniques, particularly for photovoltaic modules. The present invention addresses this need.

SUMMARY OF THE INVENTION

Therefore, a novel membrane-based moisture desorption cooling module is provided as a major advancement towards energy-free, high-flux, and high-reliability thermal management. The microporous polymeric membrane features high specific areas that contribute to high mass flux in a compact structure. The naturally-driven desorption-absorption processes involving large vaporization enthalpy yield high heat flux without energy consumption. In addition to passive cooling, this module can also offer the unique ability to harvest water during desorption. The invention is significant for developing advanced passive thermal management with water harvesting, facilitating efficient, economic, reliable, and versatile solar power technologies.

The present invention provides a membrane-based desorption cooling module. The membrane-based desorption cooling module includes a covering layer for thermally conducting and transferring heat from a solar photovoltaic (PV) panel to a solution, a solution layer for confining $H_2O$/absorbent mixtures in a multi-compartment frame, a membrane layer configured to act as an interface between the solution and air, and a supporting layer configured to increase the mechanical strength and including apertures to permit mass transfer from the membrane through the supporting layer.

In some embodiments, the solution layer is disposed between the covering layer and the membrane layer so as to connect the covering layer to the membrane layer.

In some embodiments, the multi-compartment frame includes an array of metal walls acting as fins to facilitate heat transfer.

In some embodiments, the metal walls extend from the covering layer to the membrane layer.

In some embodiments, the supporting layer is in contact with the membrane layer to abut against the membrane layer.

In some embodiments, the membrane layer is a microporous polymeric membrane.

In some embodiments, the microporous polymeric membrane is polyethylene (PE), polypropylene (PP), polytetrafluoroethylene (PTFE), polyvinylidene fluoride (PVDF), combinations thereof, or their composites, and other porous materials.

In some embodiments, the membrane layer is impermeable to liquids.

In some embodiments, only vapor is allowed to pass through the membrane layer.

In some embodiments, the supporting layer is a hollow-plate supporting layer.

In some embodiments, the membrane layer is 50-200 μm thicknesses, 0.4-0.8 porosities, and 0.2-2.0 μm pore diameters.

In some embodiments, the $H_2O$/absorbent mixture including $H_2O$/salt solutions, $H_2O$/ionic liquid solutions, other $H_2O$/absorbent solutions, or their mixtures.

In some embodiments, the $H_2O$/salt solutions further comprising LiBr, LiCl, $CaCl_2$, KBr, NaOH, and KOH; and the $H_2O$/ionic liquid solutions further comprising [DMIM][DMP], [EMIM][Ac], [BMIM][$BF_4$], [BMIM][Br], [DMIM][Cl], and [EMIM][$EtSO_4$].

In some embodiments, the membrane-based desorption cooling module has a cuboid-shape channel therein, and the covering layer defines a boundary of the cuboid-shape channel.

In some embodiments, the supporting layer is farther from the cuboid-shape channel than the covering layer, the solution layer, and the membrane layer.

In some embodiments, the membrane-based desorption cooling module has a cylindrical-shape channel therein, and the covering layer defines a boundary of the cylindrical-shape channel.

In some embodiments, the supporting layer is farther from the cylindrical-shape channel than the covering layer, the solution layer, and the membrane layer.

In some embodiments, the membrane-based desorption cooling module further comprises a condensation chamber integrated at a bottom of supporting layer for water harvesting during desorption.

The present invention provides a membrane-based desorption cooling module. The membrane-based desorption cooling module comprises a covering layer, a solution layer, a membrane layer, and a supporting layer. The covering layer is for thermally conducting and transferring heat from a battery to a solution, in which the covering layer is configured to define an outer boundary of a channel in the membrane-based desorption cooling module. The solution layer is for confining $H_2O$/absorbent mixtures in a multi-compartment frame. The membrane layer is configured to act as an interface between the solution and air. The supporting layer is configured to increase the mechanical strength and including apertures to permit mass transfer from the membrane layer through the supporting layer.

In some embodiments, the solution layer surrounds the covering layer; the membrane layer surrounds the solution layer; and the supporting layer surrounds the membrane layer.

BRIEF DESCRIPTION OF THE DRAWINGS

FIGS. 11A and 11B depict the simulation results of a membrane-based desorption cooling module for PV thermal management. FIG. 11A illustrates the evolution of temperature with time of the module with different solution layer thicknesses. FIG. 11B illustrates the concentration maps of the module with different solution layer thicknesses.

FIG. 12A shows the setup for laboratory measurement. FIG. 12B presents the temperature test results obtained through laboratory measurement. FIG. 12C presents the temperature fields measured by an infrared camera. FIG. 12D shows the setup for field measurement. FIG. 12E presents the temperature test results as measured in outdoor environment.

Figures 13A, 13B:
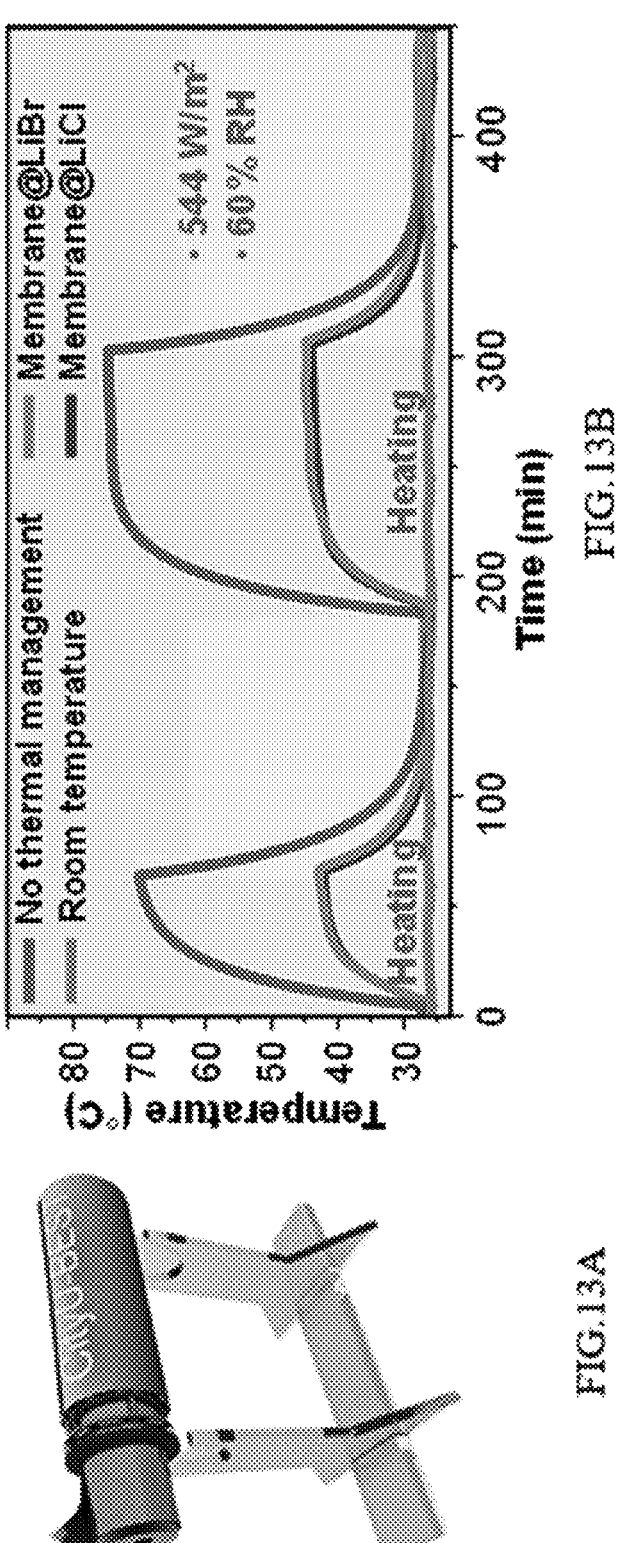
FIG. 13A demonstrates the experimental prototype of a membrane-based desorption cooling module for battery thermal management module. FIG. 13B presents the temperature test results obtained with different hygroscopic solutions used in the module prototype.

Figure 14A:
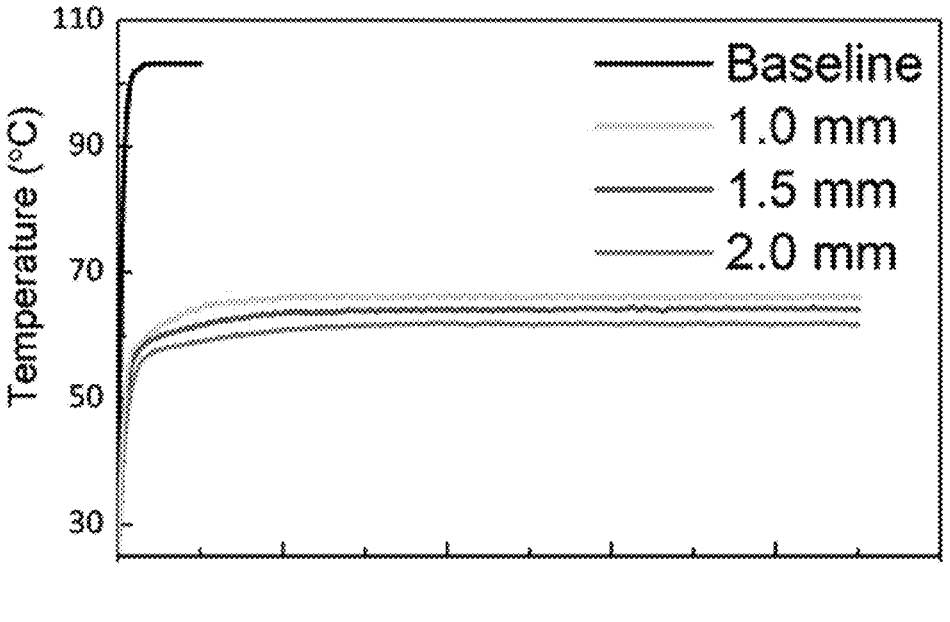
Figure 14B:
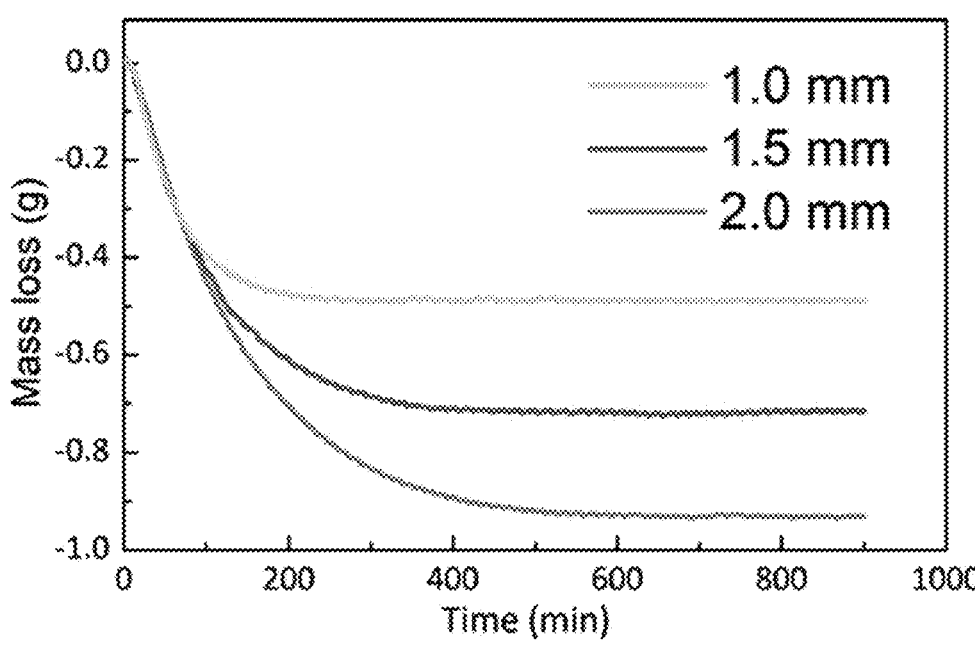

FIGS. 14A and 14B illustrate the experimental studies for a membrane-based desorption cooling module prototype for electronics thermal management. FIG. 14A presents the surface temperatures of electronics with the module prototype with different solution thicknesses. FIG. 14B presents the respective solution layer mass changes in the module prototype with different solution thicknesses.

DETAILED DESCRIPTION

Common reference numerals are used throughout the drawings and the detailed description to indicate the same or similar components. Embodiments of the present disclosure will be readily understood from the following detailed description taken in conjunction with the accompanying drawings.

Spatial descriptions, such as "on," "above," "below," "up," "left," "right," "down," "top," "bottom," "vertical," "horizontal," "side," "higher," "lower," "upper," "over," "under," and so forth, are specified with respect to a certain component or group of components, or a certain plane of a component or group of components, for the orientation of the component(s) as shown in the associated figure. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

Further, it is noted that the actual shapes of the various structures depicted as approximately rectangular may, in actual devices, be curved, have rounded edges, have somewhat uneven thicknesses, etc. due to device fabrication conditions. The straight lines and right angles are used solely for convenience of representation of layers and features.

In the following description, semiconductor devices/dies/packages, methods for manufacturing the same, and the likes are set forth as preferred examples. It will be apparent to those skilled in the art that modifications, including additions and/or substitutions may be made without departing from the scope and spirit of the present disclosure. Specific details may be omitted so as not to obscure the present disclosure; however, the disclosure is written to enable one skilled in the art to practice the teachings herein without undue experimentation.

Figure 1:
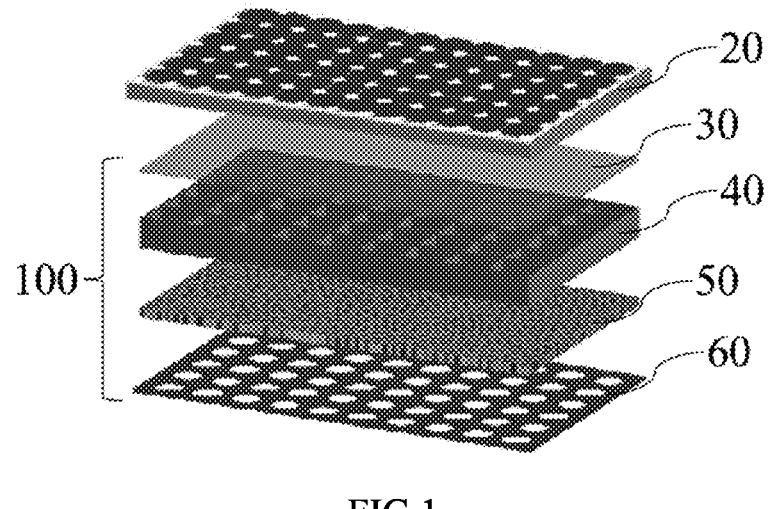
FIG. 1 is a structure overview of the membrane-based desorption cooling module.

Turning to the drawings in detail, a membrane-based desorption cooling module is provided. FIG. 1 depicts the module 100 attached to the PV panel 20 back portion and includes a covering layer 30, a solution layer 40, a membrane layer 50, and a supporting layer 60. The covering layer 30 is thermally conductive and transfers heat from the PV panel 20 to the solution.

The covering layer 30, the solution layer 40, the membrane layer 50, and the supporting layer 60 are connected to each other in a module 100. Specifically, the solution layer 40 is disposed between the covering layer 30 and the membrane layer 50 so as to connect the covering layer 30 to the membrane layer 50. The membrane layer 50 is disposed between the solution layer 40 and the supporting layer 60.

The solution layer 40 confines $H_2O$/absorbent mixtures in a multi-compartment frame with metal walls as fins to facilitate heat transfer. The metal walls can vertically extend from the covering layer 30 to the membrane layer 50. The membrane layer 50 is a microporous polymeric membrane that functions as an interface between the solution and the air. This membrane layer 50 features selectivity characteristics: it is impermeable to liquids and only allows vapor to pass through. Vapor can be separated by the direct diffusion of water molecules through the membrane, which lowers the desorption temperature. In some embodiments, only vapor is allowed to pass through the membrane layer 50. The hollow-plate supporting layer 60 is adopted to increase the mechanical strength for high durability without affecting the mass transfer through the membrane. In some embodiments, the supporting layer 60 is in contact with the membrane layer 50 to abut against the membrane layer 50, so as to achieve the increase in the mechanical strength.

Figure 2:
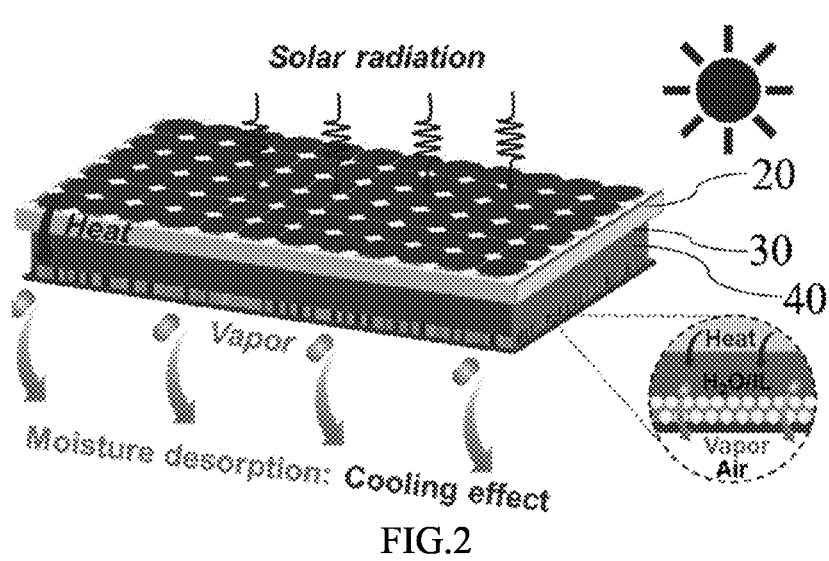
FIG. 2 depicts a membrane-based moisture desorption process in the daytime and may be used for PV thermal management.

In one aspect, the membrane-based moisture desorption process during the daytime is depicted in FIG. 2. The waste heat generated by the PV panel 20 is transferred to the solution layer 40 via the covering layer 30 and the multi-compartment frame in the daytime. The temperature of the solution increases and the vapor pressure of the solution is enhanced. When the vapor pressure of the solution is higher than that of the ambient air, water vapor is driven by the pressure difference to pass through the membrane and enter the air. This moisture desorption process provides high-flux cooling due to the large heat of vaporization. As desorption continues, the PV panel 20 cools down and the solution gets concentrated.

Figure 3:
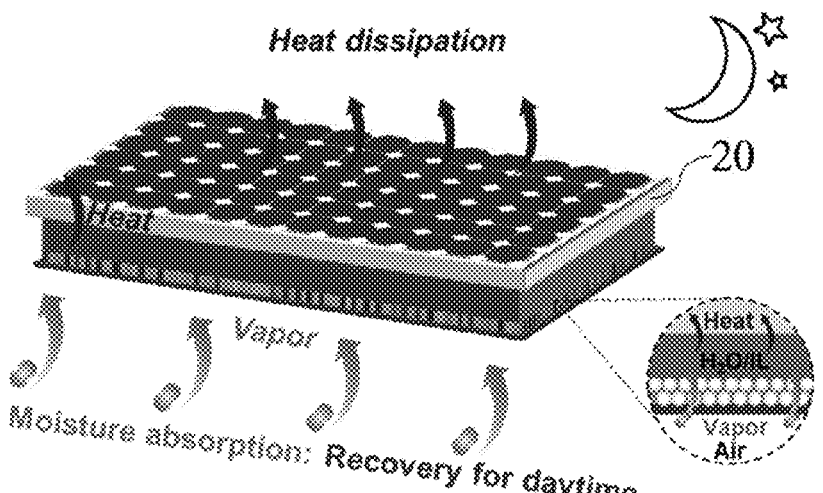
FIG. 3 depicts a membrane-based moisture absorption process at night and may be used for PV thermal management.

In another aspect, the membrane-based moisture absorption process at night is depicted in FIG. 3. There is no solar radiation and the PV panel 20 maintains a low temperature at night. The concentrated solution (after the daytime desorption) holds a lower vapor pressure than the ambient air, which enables the water vapor to pass through the membrane from the air to the solution. The moisture absorption process recovers the solution (which becomes a diluted solution) for the next-cycle desorption cooling.

The porous membrane materials include polyethylene (PE), polypropylene (PP), polytetrafluoroethylene (PTFE), polyvinylidene fluoride (PVDF), combinations thereof, or their composites; however other porous materials may also be used.

Typical membrane geometries include membrane thicknesses of 50-200 μm, porosities of 0.4-0.8, and pore diameters of 0.2-2.0 μm. Typical solution layer geometries design include a layer thickness of 2-20 mm and compartment size of 20-100 mm. Note that the geometries are not limited to these typical values.

Various working fluids (aqueous solution) may be used in the desorption cooling module 100, including $H_2O$/salt solutions, where the salt solutions are LiBr, LiCl, $CaCl_2$, KBr, NaOH, and KOH; $H_2O$/ionic liquid solutions, where the ionic liquid solutions are [DMIM][DMP](1,3-dimethylimidazolium dimethylphosphate), [EMIM][Ac](1-ethyl-3-methylimidazolium acetate), [BMIM][$BF_4$](1-butyl-3-methylimidazolium tetrafluoroborate), [BMIM][Br](1-butyl-3-methylimidazolium bromide), [DMIM][Cl](1,3-dimethylimidazolium chloride), and [EMIM][$EtSO_4$](1-ethyl-3-methylimidazolium ethyl sulfate), other $H_2O$/absorbent solutions, or their mixtures.

Optionally, quantum dots may be included in the working fluid solution. For example, carbon quantum dots into $H_2O$/ionic liquids may increase heat/mass transfer whilst avoiding deposition risk (increasing reliability).

The desorption-absorption mechanism of the desorption cooling module 100 is represented by the equation below:

Diluted $H_2O$/Absorbent +

$$\text{heat} \underset{\xrightarrow{absorption}}{\xleftarrow{desorption}} \text{Concentrated } H_2O/\text{Absorbent} + H_2O$$

Figure 4:
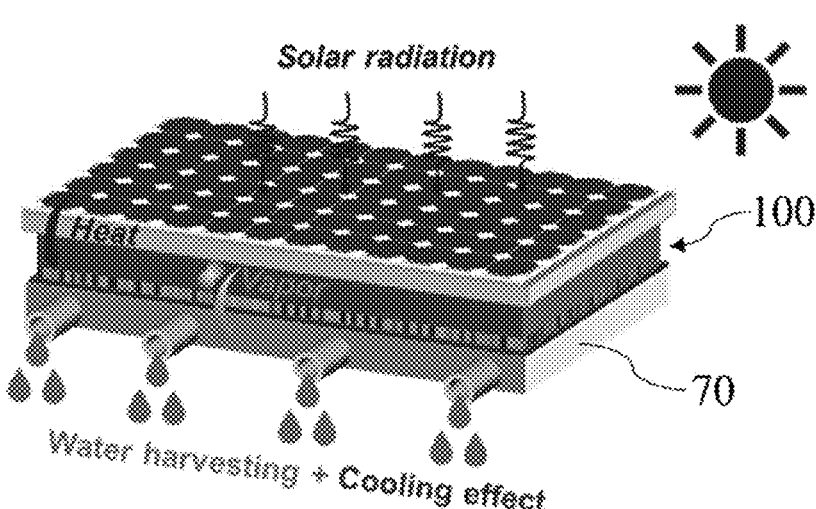
FIG. 4 depicts a membrane-based desorption cooling module with water harvesting and may be used for PV thermal management.

FIG. 4 depicts a membrane-based desorption cooling process for PV thermal management and water harvesting. In addition to passive thermal management, the present invention can also offer the unique ability to harvest water from the atmosphere. As shown in FIG. 4, a condensation chamber 70 can be further integrated at the bottom of the membrane-based desorption cooling module 100 for water harvesting during desorption. The harvested water can be used for PV dust cleaning, agriculture irrigation, daily living, etc. Therefore, the present invention is significant for developing novel versatile solar power technologies.

Apart from PV thermal management, the proposed membrane-based desorption cooling method can also be used for the passive thermal management of electronics (e.g., chips), batteries, or any other devices that require heat removal. The membrane-based desorption cooling module 100 in FIG. 1 may be fabricated into different shapes and dimensions to accommodate different devices.

Figure 5:
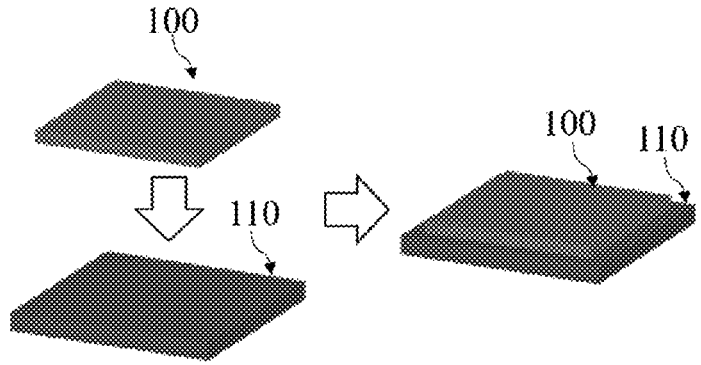
FIG. 5 depicts a membrane-based desorption cooling module for electronics thermal management.

For example, FIG. 5, depicts a membrane-based desorption cooling module 100 attached to an electronic 110 for electronics thermal management. In this regard, the covering layer of the membrane-based desorption cooling module 100 as afore mentioned can make contact with the electronic 110.

Figure 6:
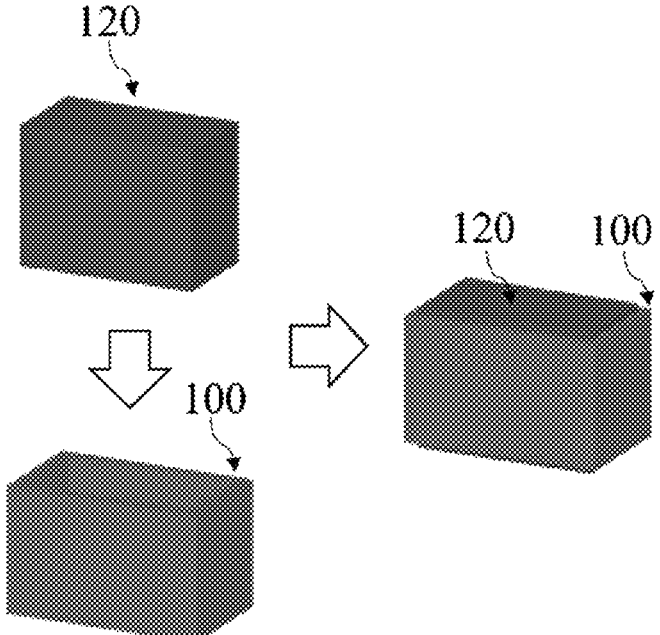
FIG. 6 depicts a membrane-based desorption cooling module for battery thermal management (cuboid battery).

FIG. 6 depicts a membrane-based desorption cooling module 100 for thermal management of cuboid-shape batteries. As illustration, a membrane-based desorption cooling module 100 is attached to a cuboid-shape battery 120 for battery thermal management. Specifically, the membrane-based desorption cooling module 100 may have a cuboid-shape channel therein. The covering layer can serve as the most inside one among the layers of the membrane-based desorption cooling module 100. As such, the covering layer can define a boundary of the cuboid-shape channel, which is the outer boundary/border of the cuboid-shape channel. The covering layer of the membrane-based desorption cooling module 100 can make contact with the cuboid-shape battery 120. Furthermore, from the cuboid-shape channel to the outer border of the membrane-based desorption cooling module 100, the solution layer surrounds the covering layer; the membrane layer surrounds the solution layer; and the supporting layer surrounds the membrane layer, so that the supporting layer can be farther from the cuboid-shape channel than the covering layer, the solution layer, and the membrane layer.

Figure 7:
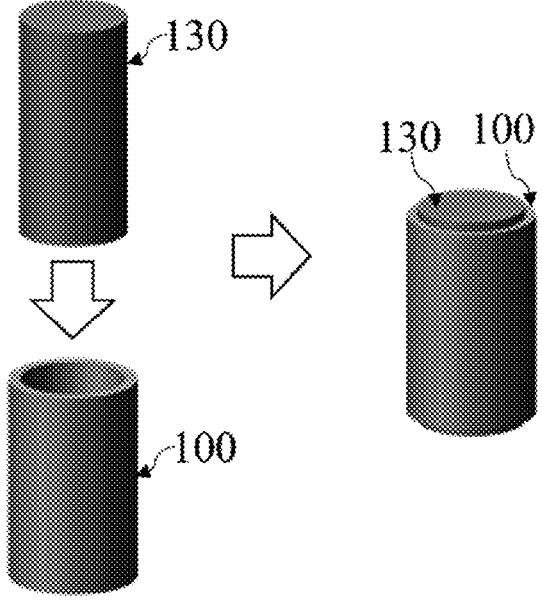
FIG. 7 depicts a membrane-based desorption cooling module for battery thermal management (cylindrical battery).

FIG. 7 depicts a membrane-based desorption cooling module 100 for thermal management of cylindrical-shape batteries. As illustration, a membrane-based desorption cooling module 100 is attached to a cylindrical-shape battery 130 for battery thermal management. Similarly, the membrane-based desorption cooling module 100 may have cylindrical-shape channel therein. The covering layer can define a boundary of the cuboid-shape channel as well. The covering layer of the membrane-based desorption cooling module 100 can make contact with the cylindrical-shape battery 130. Note that other shapes are also applicable.

Figure 8:
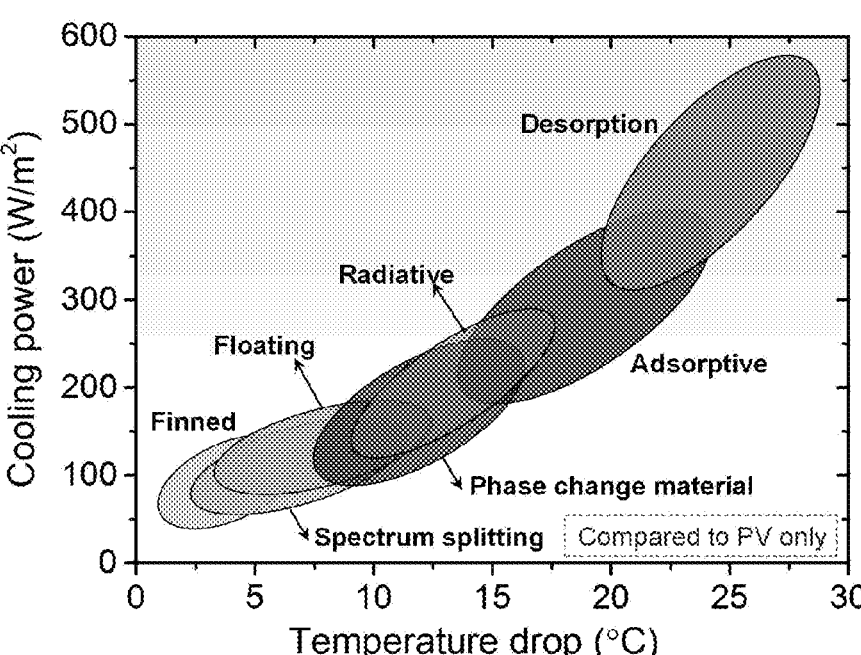
FIG. 8 shows a comparison of different passive cooling methods.

FIG. 8 shows the comparison of the temperature drops and cooling capacity of different passive cooling methods. The proposed membrane-based desorption cooling module is compared with conventional and emerging passive thermal management technologies, including finned structures, floating PV, spectrum splitting, radiative cooling, phase change material, and adsorptive hydrogel. The present invention of membrane-based desorption cooling method significantly outperforms the others, yielding a much higher cooling power and greater temperature drop.

Example 1

Figure 9:
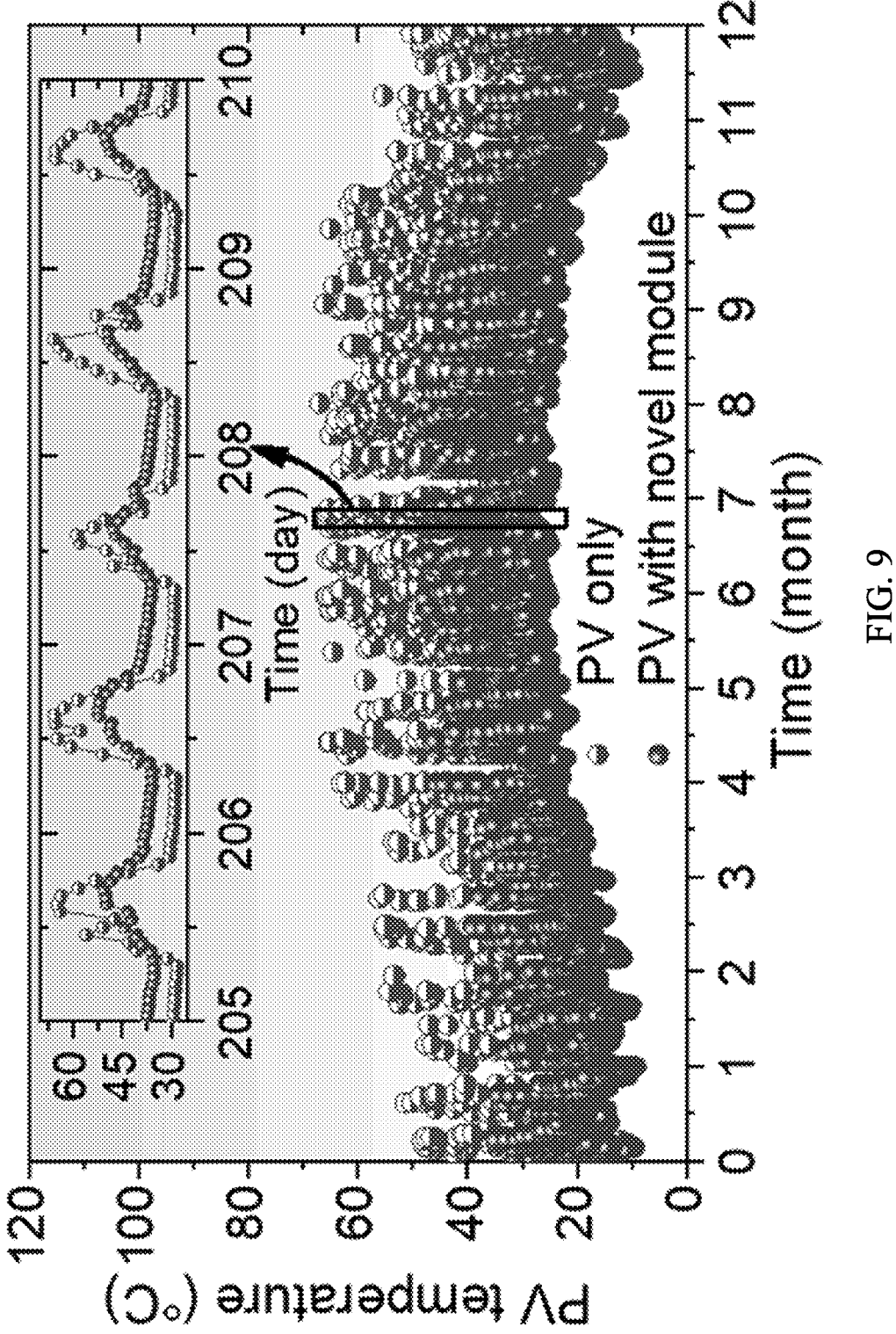
FIG. 9 shows dynamic PV temperatures with and without desorption cooling module.

FIG. 9 depicts dynamic PV temperatures with and without desorption cooling modules, that is, compares the hourly PV temperatures between the PV panels with and without the present invention throughout the year in Hong Kong. FIG. 9 clearly demonstrates that the PV temperature can be effectively reduced by the novel module. By reducing the temperature of the PV module, the efficiency of the PV cell is increased. FIG. 9 demonstrates that the membrane-based desorption cooling system provides energy-free, high-flux, and high-reliability thermal management.

Example 2

Figure 10:
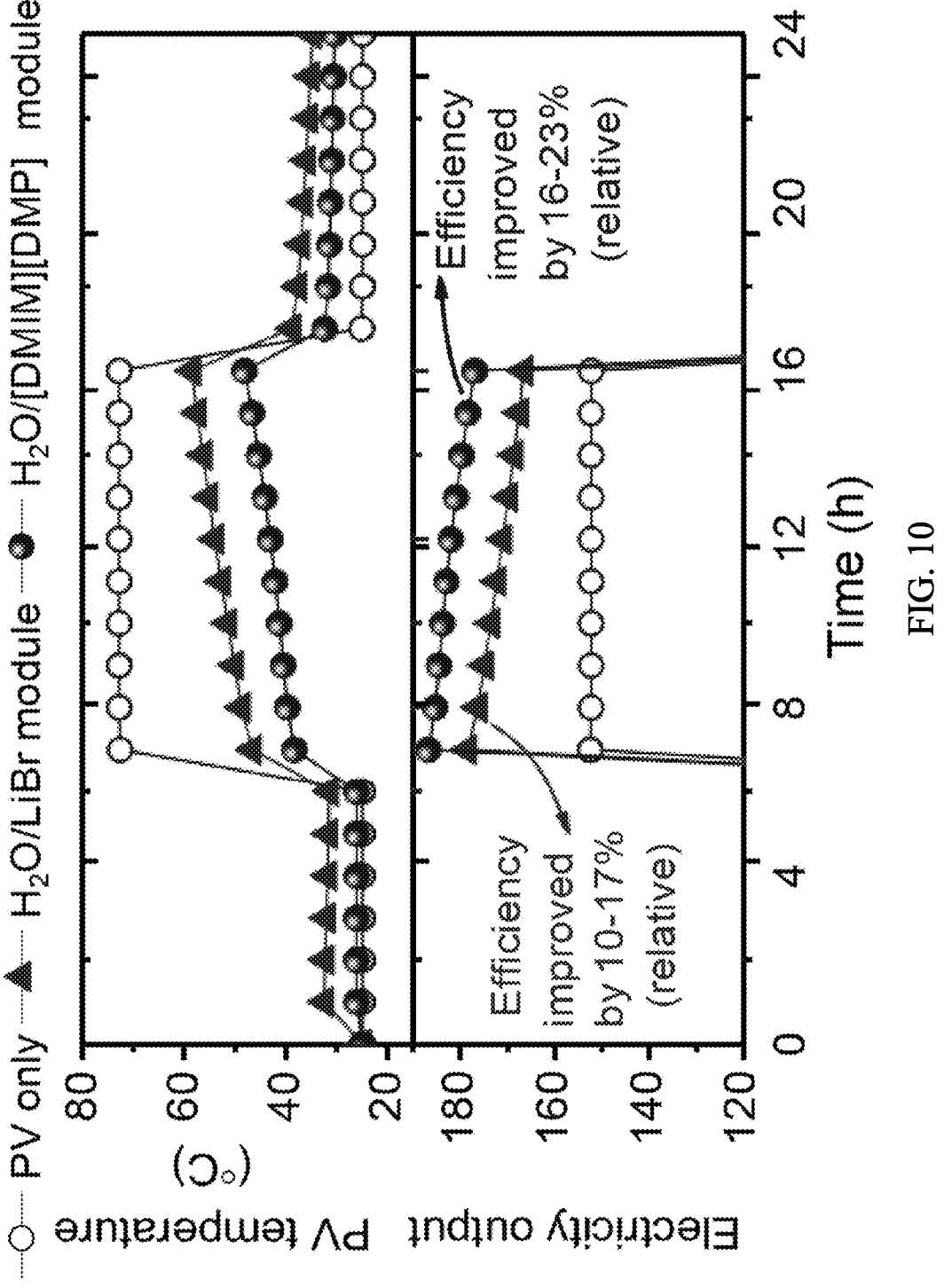
FIG. 10 depicts the dynamic temperatures of PV panels with direct dissipation, $H_2O$/LiBr module, and $H_2O$/IL module.

FIG. 10 depicts the dynamic temperatures of PV panels with direct dissipation, a $H_2O/LiBr$ solution module, and a $H_2O$/ionic liquid solution module. In one embodiment, the ionic liquid solution is [DMIM][DMP]. Between 6 to 16 hours, the PV temperature of a PV panel only (that is, with no cooling system) reaches around 70-80° C.; the PV temperature of a panel including a $H_2O/LiBr$ solution module reaches around 50-60° C.; the PV temperature of a panel including a $H_2O$/[DMIM][DMP] solution module reaches around 35-50° C. As for the electricity output, the PV panel with no cooling outputs around 150 W between 6 to 16 hours; the PV panel with a $H_2O/LiBr$ solution module outputs around 165-180 W between 6 to 16 hours; the PV panel with a $H_2O$/[DMIM][DMP] solution module outputs around 175-190 W between 6 to 16 hours. When comparing the PV panel with no cooling to the PV panel with a $H_2O/LiBr$ solution module, the efficiency of the PV panel with a $H_2O/LiBr$ solution module improved by 10-17%. When comparing the PV with no cooling to the PV panel with a $H_2O$/[DMIM][DMP] solution module, the efficiency of the PV panel with a $H_2O$/[DMIM][DMP] solution module improved by 16-23%.

In daytime, the PV efficiency is greatly improved by desorption-absorption passive cooling, especially using ionic liquid solutions.

Research Methods and Results:
PV Thermal Management:

FIGS. 11A and 11B depict the simulation results of a membrane-based desorption cooling module for PV thermal management. Compared with the basic PV module (PV only), the PV with 12 mm solution layer can achieve a significant temperature drop because the desorption process provides high-flux cooling due to the large heat of vaporization. As the desorption continues, the solution gets concentrated. At night, the PV is cooled down and the concentrated solution holds a lower vapor pressure, which enables the vapor to pass through the membrane from the air to the solution. Comparisons between FIG. 11A and FIG. 11B indicate that a thicker solution layer can achieve a lower temperature; this increased temperature drop is attributed to the higher cooling capacity of the larger solution volume.

Figures 12A, 12B, 12C, 12D, 12E:
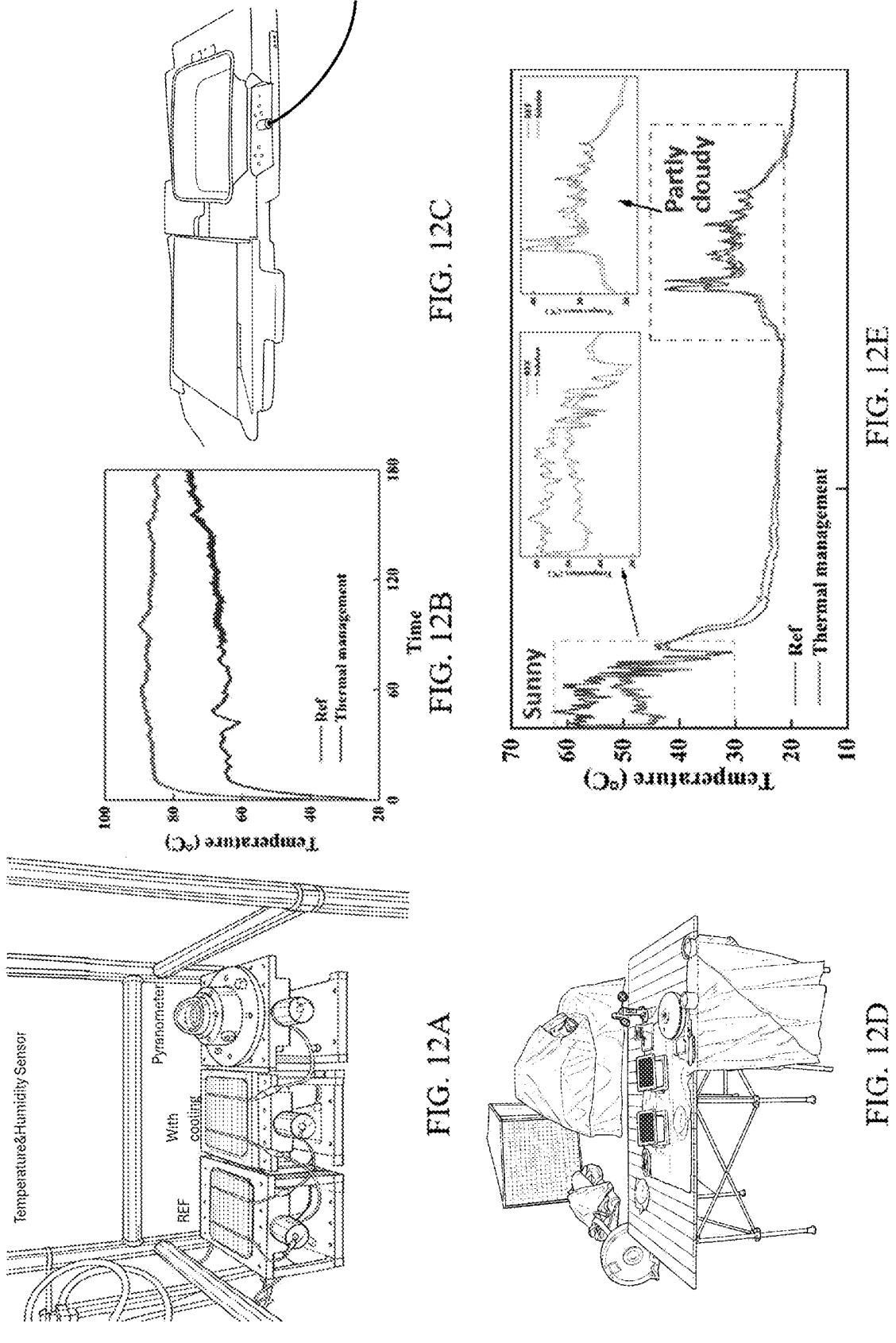
FIGS. 12A to 12E present the experimental studies of the membrane-based desorption cooling module for PV thermal management.

FIGS. 12A-12C demonstrate the laboratory test of a basic PV module (REF) and a PV module with thermal management (with cooling). Under the 1.4 sun illumination provided by the solar simulator, this module provides an average temperature drop of 18° C.

FIGS. 12D-12E present the field test results of a basic PV module (REF) and a PV module with thermal management (with cooling). Under the transient ambient conditions, the temperature of the novel PV module with thermal management is always lower than that of the basic PV module, especially in high-irradiance conditions on a sunny day. The geometry design and solution composition of this module can be optimized to further improve the performance.

Battery Thermal Management:

As shown in FIG. 13A, a membrane-based battery thermal management prototype is developed, aiming for a 18650 lithium battery. In the experimental study, an electric heater is used to emulate the real battery, which is a common experimental method. FIG. 13B compares the temperatures of three cases: battery without thermal management, battery with the proposed module using LiBr solution, and battery with the proposed module using LiCl solution. The period with heating means that the battery is in operation. It is found that both the two hygroscopic solutions have a significant temperature reduction of ~30° C.

Electronics Thermal Management:

An experimental prototype is developed for the electronics thermal management module, using a heater to emulate the heat generation of electronics in the lab. FIG. 14 depicts the surface temperature and solution mass evolution under 50 wt % LiBr solution, 25° C. ambient temperature, and 60% relative humidity. FIG. 14A shows that the maximum temperature differences between the baseline (without LiBr solution) and the novel module with different solution thicknesses are 36.9° C., 38.8° C., and 41.1° C., respectively. A bigger temperature reduction is achieved as the solution thickness increases, which can be attributed to the higher moisture desorption rate, as shown in FIG. 14B.

INDUSTRIAL APPLICABILITY

The present invention provides a membrane-based desorption cooling module which achieves energy-free, high-flux, and high-reliability thermal management due to the following advantages:

(1) The naturally-driven desorption-absorption processes involving large vaporization enthalpy yield high heat flux without energy consumption.

(2) The microporous polymeric membrane features high specific areas that contribute to high mass flux in a compact structure.

(3) The module structure is simple and the working fluid is stable, maintaining the high reliability of the passive thermal management method.

Compared with conventional and emerging passive thermal management technologies (including finned structure, floating PV, spectrum splitting, radiative cooling, phase change material, and adsorptive hydrogel), the membrane-based desorption cooling method shows much higher cooling power and temperature drop.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A membrane-based desorption cooling module, comprising:
   a covering layer for thermally conducting and transferring heat from a device to a solution;
   a solution layer for confining H$_2$O/absorbent mixtures in a multi-compartment frame;
   a membrane layer configured to act as an interface between the solution and air;
   a supporting layer configured to induce an increased mechanical strength to the cooling module and including apertures to permit mass transfer from the membrane layer through the supporting layer;
   wherein the supporting layer is a hollow-plate supporting layer.

2. The membrane-based desorption cooling module according to claim 1, wherein the solution layer is disposed between the covering layer and the membrane layer so as to connect the covering layer to the membrane layer.

3. The membrane-based desorption cooling module according to claim 2, wherein the multi-compartment frame includes an array of metal walls acting as fins to facilitate heat transfer.

4. The membrane-based desorption cooling module according to claim 3, wherein the metal walls extend from the covering layer to the membrane layer.

5. The membrane-based desorption cooling module according to claim 1, wherein the supporting layer is in contact with the membrane layer to abut against the membrane layer.

6. The membrane-based desorption cooling module according to claim 1, wherein the membrane layer is a microporous polymeric membrane.

7. The membrane-based desorption cooling module according to claim 6, wherein the microporous polymeric membrane is selected from the group consisting of polyethylene (PE), polypropylene (PP), polytetrafluoroethylene (PTFE), polyvinylidene fluoride (PVDF), combinations thereof, or their composites, and other porous materials.

8. The membrane-based desorption cooling module according to claim 1, wherein the membrane layer is impermeable to liquids.

9. The membrane-based desorption cooling module according to claim 1, wherein only vapor is allowed to pass through the membrane layer.

10. The membrane-based desorption cooling module according to claim 1, wherein the membrane layer is a membrane with a thickness in the range of 50-200 μm, a porosity in the range of 0.4-0.8, and an average pore diameter in the range of 0.2-2.0 μm.

11. The membrane-based desorption cooling module according to claim 1, wherein the H$_2$O/absorbent mixture is selected from the group consisting of H$_2$O/salt solutions, H$_2$O/ionic liquid solutions, other H$_2$O/absorbent solutions, or their mixtures.

12. The membrane-based desorption cooling module according to claim 11, wherein the H$_2$O/salt solutions are further selected from the group consisting of LiBr, LiCl, CaCl$_2$), KBr, NaOH, and KOH; and
   wherein the H$_2$O/ionic liquid solutions are further selected from the group consisting of [DMIM][DMP], [EMIM][Ac], [BMIM][BF$_4$], [BMIM][Br], [DMIM], and [EMIM][EtSO$_4$].

13. The membrane-based desorption cooling module according to claim 1, wherein the membrane-based desorption cooling module has a cuboid-shape channel therein, and the covering layer defines a boundary of the cuboid-shape channel.

14. The membrane-based desorption cooling module according to claim 13, wherein the supporting layer is farther from the cuboid-shape channel than the covering layer, the solution layer, and the membrane layer.

15. The membrane-based desorption cooling module according to claim 1, wherein the membrane-based desorption cooling module has a cylindrical-shape channel therein, and the covering layer defines a boundary of the cylindrical-shape channel.

16. The membrane-based desorption cooling module according to claim 15, wherein the supporting layer is farther from the cylindrical-shape channel than the covering layer, the solution layer, and the membrane layer.

17. The membrane-based desorption cooling module according to claim 1, further comprising:
   a condensation chamber integrated at a bottom of supporting layer for water harvesting during desorption.

18. A membrane-based desorption cooling module, comprising:
   a covering layer for thermally conducting and transferring heat from a battery to a solution, wherein the covering layer is configured to define an outer boundary of a channel in the membrane-based desorption cooling module;
   a solution layer for confining H$_2$O/absorbent mixtures in a multi-compartment frame;
   a membrane layer configured to act as an interface between the solution and air;
   a supporting layer configured to induce an increased mechanical strength to the cooling module and including apertures to permit mass transfer from the membrane layer through the supporting layer.

19. The membrane-based desorption cooling module according to claim 18, wherein the solution layer surrounds the covering layer, the membrane layer surrounds the solution layer, and the supporting layer surrounds the membrane layer.

* * * * *